& Wands

United States Patent [19]
Morinaga et al.

[11] Patent Number: 4,628,314
[45] Date of Patent: Dec. 9, 1986

[54] METHOD AND APPARATUS FOR DETECTING POSITION AND VELOCITY OF MOVING BODY

[75] Inventors: Shigeki Morinaga, Hitachi; Yasuyuki Sugiura, Takahagi; Kunio Miyashita; Tadashi Takahashi, both of Hitachi, all of Japan

[73] Assignee: Hitachi, Ltd., Tokyo, Japan

[21] Appl. No.: 668,893

[22] Filed: Nov. 7, 1984

[30] Foreign Application Priority Data

Nov. 8, 1983 [JP] Japan .................................. 58-208221

[51] Int. Cl.⁴ .................. G08C 19/16; G01P 3/52; G01P 13/00
[52] U.S. Cl. ............................. 340/870.24; 324/165; 318/341; 340/870.18
[58] Field of Search ................ 361/240, 236; 318/599, 318/341; 340/870.24, 870.37, 870.18; 324/160, 165, 166

[56] References Cited

U.S. PATENT DOCUMENTS

| | | | |
|---|---|---|---|
| 3,616,692 | 11/1971 | Keller | 340/870.24 |
| 3,670,324 | 6/1972 | Trevor | 340/870.24 |
| 4,038,588 | 7/1977 | Woolfson | 318/599 |
| 4,288,730 | 9/1981 | Graham | 318/599 |
| 4,323,829 | 4/1982 | Witney | 318/599 |
| 4,468,617 | 8/1984 | Ringwall | 324/165 |
| 4,481,468 | 11/1984 | Ono | 324/165 |

FOREIGN PATENT DOCUMENTS 0702478 12/1979 U.S.S.R. ............................. 318/341

Primary Examiner—Reinhard J. Eisenzopf
Assistant Examiner—Jose M. Solis
Attorney, Agent, or Firm—Antonelli, Terry & Wands

[57] ABSTRACT

A method for detecting the position and the velocity by using an encoder mounted directly on a moving body wherein original signals of the encoder are pulse-width modulated by using a sampling carrier wave and the position is detected by measuring the width of the pulses thus obtained. An apparatus for implementing the method comprises a carrier wave generation circuit, a pulse width modulation circuit which pulse-width modulates the original signals coming from the encoder by using the carrier wave, a pulse width timer which measures the width of the pulses thus modulated, and a microcomputer connected to the pulse width timer.

5 Claims, 31 Drawing Figures

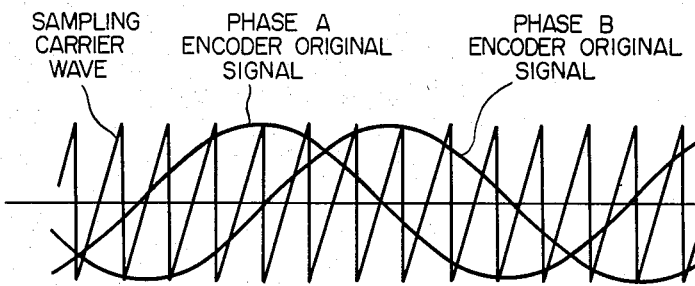

FIG. 7

| QUADRANT | FORWARD DIRECTION | REVERSE DIRECTION |
|---|---|---|
| I | $\dfrac{2}{\pi}\left[\sin^{-1}\left\{\dfrac{|Ts/2-TE|}{Ts/2}\right\}\right]$ | $3+\dfrac{2}{\pi}\left[\dfrac{\pi}{2}-\sin^{-1}\left\{\dfrac{|Ts/2-TE|}{Ts/2}\right\}\right]$ |
| II | $1+\dfrac{2}{\pi}\left[\dfrac{\pi}{2}-\sin^{-1}\left\{\dfrac{|Ts/2-TE|}{Ts/2}\right\}\right]$ | $2+\dfrac{2}{\pi}\left[\sin^{-1}\left\{\dfrac{|Ts/2-TE|}{Ts/2}\right\}\right]$ |
| III | $2+\dfrac{2}{\pi}\left[\sin^{-1}\left\{\dfrac{|Ts/2-TE|}{Ts/2}\right\}\right]$ | $1+\dfrac{2}{\pi}\left[\dfrac{\pi}{2}-\sin^{-1}\left\{\dfrac{|Ts/2-TE|}{Ts/2}\right\}\right]$ |
| IV | $3+\dfrac{2}{\pi}\left[\dfrac{\pi}{2}-\sin^{-1}\left\{\dfrac{|Ts/2-TE|}{Ts/2}\right\}\right]$ | $\dfrac{2}{\pi}\left[\sin^{-1}\left\{\dfrac{|Ts/2-TE|}{Ts/2}\right\}\right]$ |

METHOD AND APPARATUS FOR DETECTING POSITION AND VELOCITY OF MOVING BODY

This invention relates to a method and an apparatus for detecting the position and the velocity of a moving body, in particular to a method and an apparatus suitable for detecting low speed rotation with high precision by pulse-width modulating original signals coming from an encoder.

A method for controlling digitally the velocity of a moving or rotating body such as an electric motor is explained by referring to the block diagram representing a prior art velocity control apparatus shown in FIG. 1.

In FIG. 1, reference numeral 1 denotes a microcomputer; 2 a velocity command section receiving orders from a host system; 3 a gating circuit for supplying electric current command calculated by the microcomputer 1 to an electric power converter 4; and 5 a control motor. Reference numeral 6 represents a pulse generator, which generates n pulses per turn and generates an output pulse PLG and which is connected directly to the control motor 5, and 7 denotes a velocity detection circuit.

In this apparatus, a signal processing circuit is necessary in order to obtain a velocity detection value $N_f$ as a digital value from the microcomputer 1 by counting pulses coming from the pulse generator 6.

As the above-mentioned method, there is a known method, such as disclosed in Japanese Patent Application Laid-Open No. 144465/82 (corresponding to U.S. patent application Ser. No. 352,083 filed on Feb. 25, 1982 and European Patent Application Publication No. 0,059,433 published on Sept. 8, 1982) entitled "Method for Detecting the Velocity", wherein the number of pulses $P_N$ generated by the pulse generator 6 during a constant time interval having a width $\tau_{dk}$ is counted and the velocity detection value $N_f$ is obtained by using the following equation, $$N_f = K_1 \frac{P_N}{\tau_{dk}}$$

in which $K_1$ is a constant.

By this method, the number of pulses $P_N$ relating to the counted value becomes smaller and the resolving power is lowered with decreasing velocity.

Moreover, since the time width $\tau_{dk}$ is constant, the detection is difficult when the above-mentioned number of pulses $P_N$ is 1 or smaller. Thus, it was impossible to detect extremely low or nearly zero speed rotation.

There is another problem, that is, the calculation according to the above equation is intiated after the measuring conditions of $P_N$ and $\tau_{dk}$ are established, and accordingly, in detecting the extremely low velocity region, the calculation operation is caused to stand by until the pulses have been outputted, causing the lowered response speed in the system and unstabilizing the system.

Further, recently a number of servo-motors are used in NC machines, robots, and so forth. On the other hand, owing to the progress in the semiconductor techniques, utilization of microcomputers as well as digitalization for control circuits are advancing rapidly.

In such a case, how the velocity is detected is an important question.

A velocity detection method will be explained at first, referring to FIGS. 2, 3A–3G, and 4A–4G, wherein FIG. 2 is a block diagram representing a velocity detection circuit used in the velocity detection method previously developed by the inventors of the present invention by using encoder pulses, FIGS. 3A–3G are time charts for the velocity detection, and FIGS. 4A–4G are time charts for the low velocity detection. These figures show outlines of the method proposed already by the inventors of the present invention in Japanese Patent Application Nos. 141940/83, 160449/83 and 167617/83.

The microcomputer is made up of a CPU 101, a ROM 102 and a RAM 103, as indicated in FIG. 2, and effects control for velocity detection and operations.

For the velocity detection the velocity can be obtained by using the number of pulses $P_N$ during a certain time interval and its time width $T_d$ according to the following equation (1)

$$V_F = K_1 \frac{P_N}{T_d} \tag{1}$$

in which $K_1$ is a constant, which is determined by the number of encoder pulses per turn.

The encoder is, in general, mounted on the shaft of a servo-motor and generates two encoder pulse signals having different phases, i.e. phase A and phase B, which are different by 90° from each other, as indicated in FIGS. 3A and 3B.

Reference numeral 108 represents an encoder pulse shaping circuit, which detects rising and falling edges of the encoder pulse signals having different phases and generates signals $T_1$ indicated in FIG. 3.

On the other hand, reference numeral 104 represents a sampling timer connected to a data bus 110 of the microcomputer, which timer generates signals $T_2$, indicated in FIG. 3D having a width corresponding to the sampling time interval $T_s$ for detecting the velocity.

Reference numeral 105 represents a pulse counter connected to the data bus 110, which counter counts the number of encoder pulse signals $T_1$ during the sampling time interval $T_s$, as indicated in FIG. 3F.

Data concerning the number of pulses $P_N$ thus counted are taken through the data bus 110 in the microcomputer.

Reference numeral 107 is a synchronizing circuit, which latches the signals $T_2$ to be used for sampling by using the encoder pulse signal $T_1$. Output of this synchronizing circuit 107 is signals $T_3$ indicated in FIG. 3E.

Reference numeral 106 represents a time width timer connected to the data bus 110 of the microcomputer as in the case of the sampling timer 104 and the pulse counter 105 and it measures the time width $T_d$ of the output signals $T_3$ of the synchronizing circuit 107 as shown in FIG. 3G.

Data about the time width $T_d$ thus measured are taken through the data bus 110 in the microcomputer.

The microcomputer carries out operations according to the equation (1) mentioned above, using the data about the number of encoder pulses $P_N$ and those about the time width $T_d$, which are taken therein, as indicated above, in order to detect the velocity $V_F$.

However, such method has a disadvantage that, when the motor rotates slowly, it is impossible to detect the velocity during each of the sampling time intervals.

FIGS. 4A–4G are time charts for low speed rotation. In the case of low speed rotation, the following problems arise. One problem is that the sampling time $T_S$ cannot be synchronized with the encoder pulse signal $T_1$ (domain B ), and other is that the time width $T_d$ is excessively long, although it is synchronized (domain A ).

These problems lead to a drawback that the sampling time in the control system is equivalently lengthened, resulting in the worsened response of the system.

Furthermore, when the motor stands still it is impossible to detect the velocity by this velocity detection method described above.

On the contrary, when the motor rotates rapidly, high precision detection is possible by the method mentioned above.

In view of the unsatisfactory point in the method previously developed by the inventors that it requires long time to detect low velocity, worsening the response of the system, an object of this invention is to provide a method for detecting the position and the velocity of a displacing body, which works stably for low velocity detection and permits to detect it within a sampling time interval and apparatus for detecting the position and the velocity, which can be used for implementing the method.

According to one aspect of the invention, a method for detecting the position and the velocity by using an encoder mounted directly on the displacing body comprises the steps of pulse-width modulating original signals of the encoder by using a sampling carrier wave and measuring the width of the pulses generated by pulse-width modulating the original signal to detect the position.

According to another aspect of the present invention, an apparatus for detecting the position and the velocity of a moving body by using an encoder mounted directly on the moving body comprises a carrier wave generation circuit for generating a carrier wave, a pulse width modulation circuit which pulse-width modulates the original signals coming from the encoder by using the carrier wave, a pulse width timer which measures the width of the pulses generated by pulse-width modulating the original signals, and a microcomputer connected to the pulse width timer.

More specifically, the device is constructed as follows.

In general, an encoder generates original signals varying sinusoidally and encoder pulses are produced by shaping these encoder original signals.

According to this invention, these encoder original signals varying sinusoidally are utilized for the velocity detection. For this purpose, these encoder original signals are modulated by using a sampling carrier wave according to pulse width modulation techniques. The time-length of the width of the pulses thus modulated is measured in order to detect the position of the encoder original signals and the velocity of the moving body is detected on the basis of the variations of the position.

BRIEF DESCRIPTION OF THE DRAWINGS

The present invention will be apparent from the following detailed, description taken in conjunction with the accompanying drawings, in which:

FIGS. 6A-6L are time charts for low speed detection, when the apparatus of FIG. 5 is used;

FIG. 7 is a scheme showing the position for every quadrant used for calculation of phase data.

Hereinbelow an embodiment of the method for detecting the position and the velocity according to the present invention will be explained in conjunction with an apparatus for detecting the position and the velocity for implementing the method, referring to FIG. 5 through FIG. 7.

Figure 5:
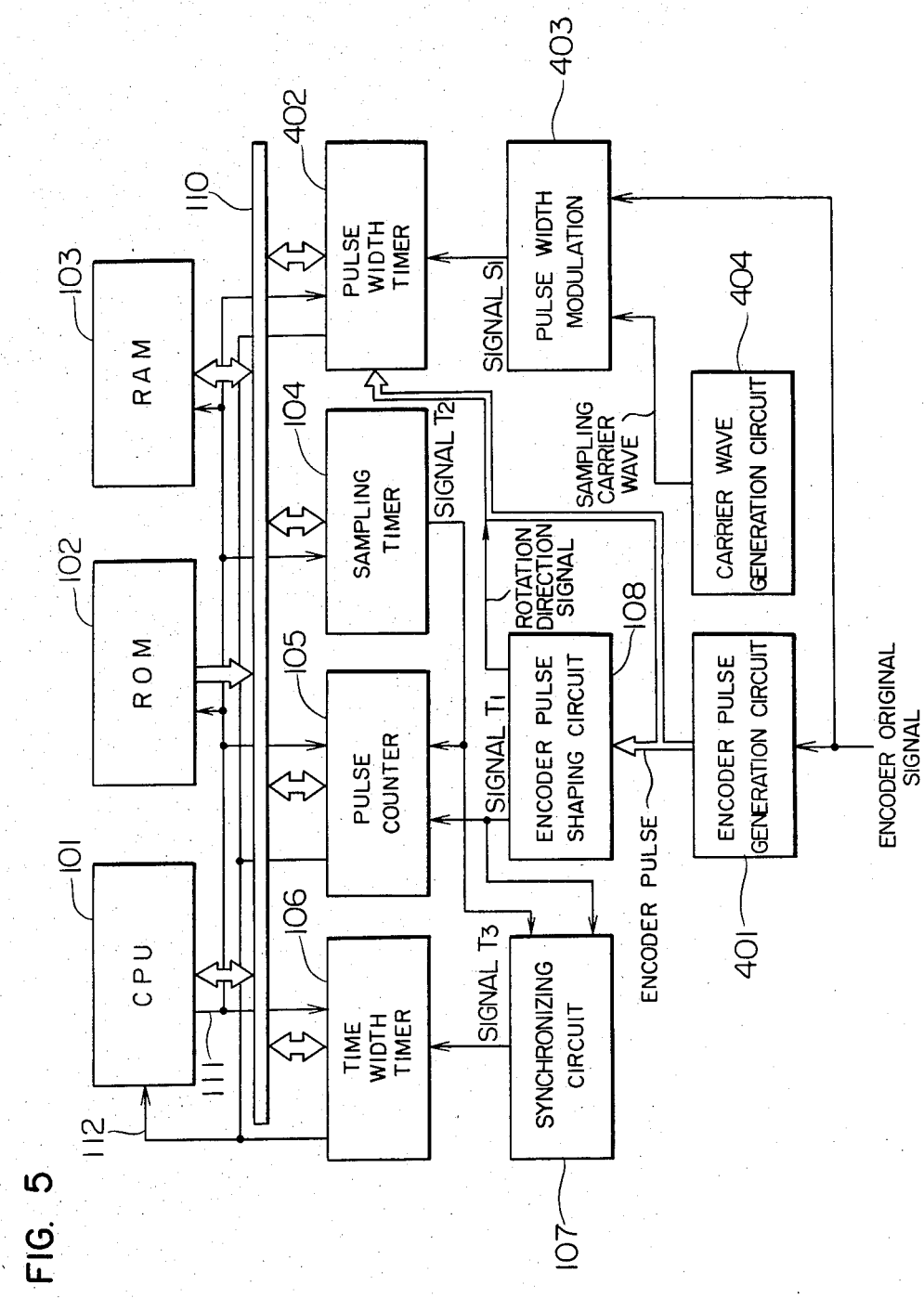
FIG. 5 is a block diagram showing the construction of the apparatus for detecting the position and the velocity for implementing the method for detecting the position and the velocity according to an embodiment of the present invention.
Figure 8:
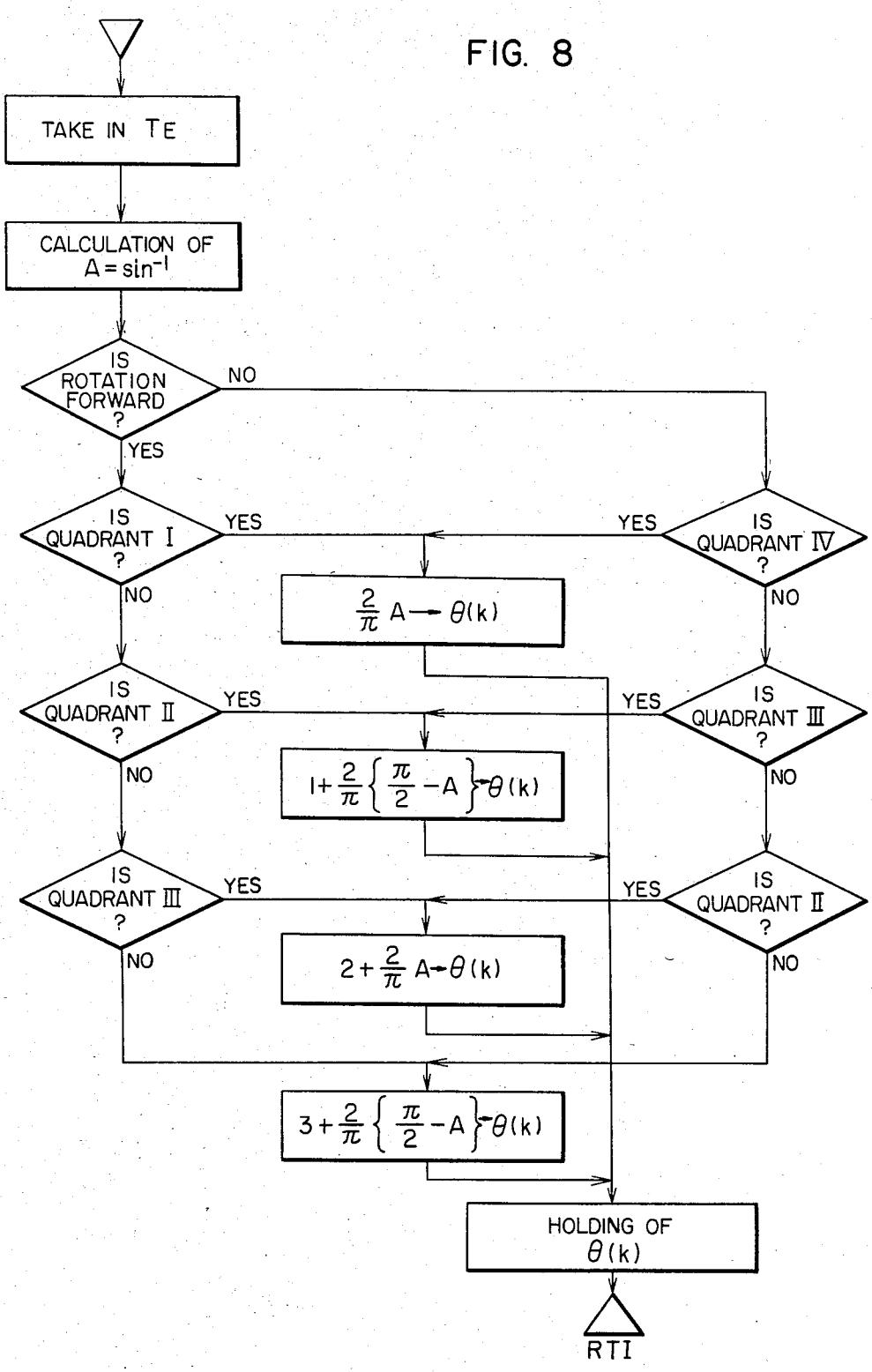
FIG. 8 is a flow chart for calculating the position according to the method of the present invention.

FIG. 5 is a block diagram showing the construction of an apparatus for detecting the position and the velocity for implementing the method for detecting the position and the velocity according to an embodiment of the invention; FIG. 6 is a time chart for low speed detection, when the apparatus shown in FIG. 5 is used; FIG. 7 is a scheme showing the position for every quadrant used for calculation of phase data; and FIG. 8 is a flow chart for calculating the position according the method of the present invention.

Figure 1:
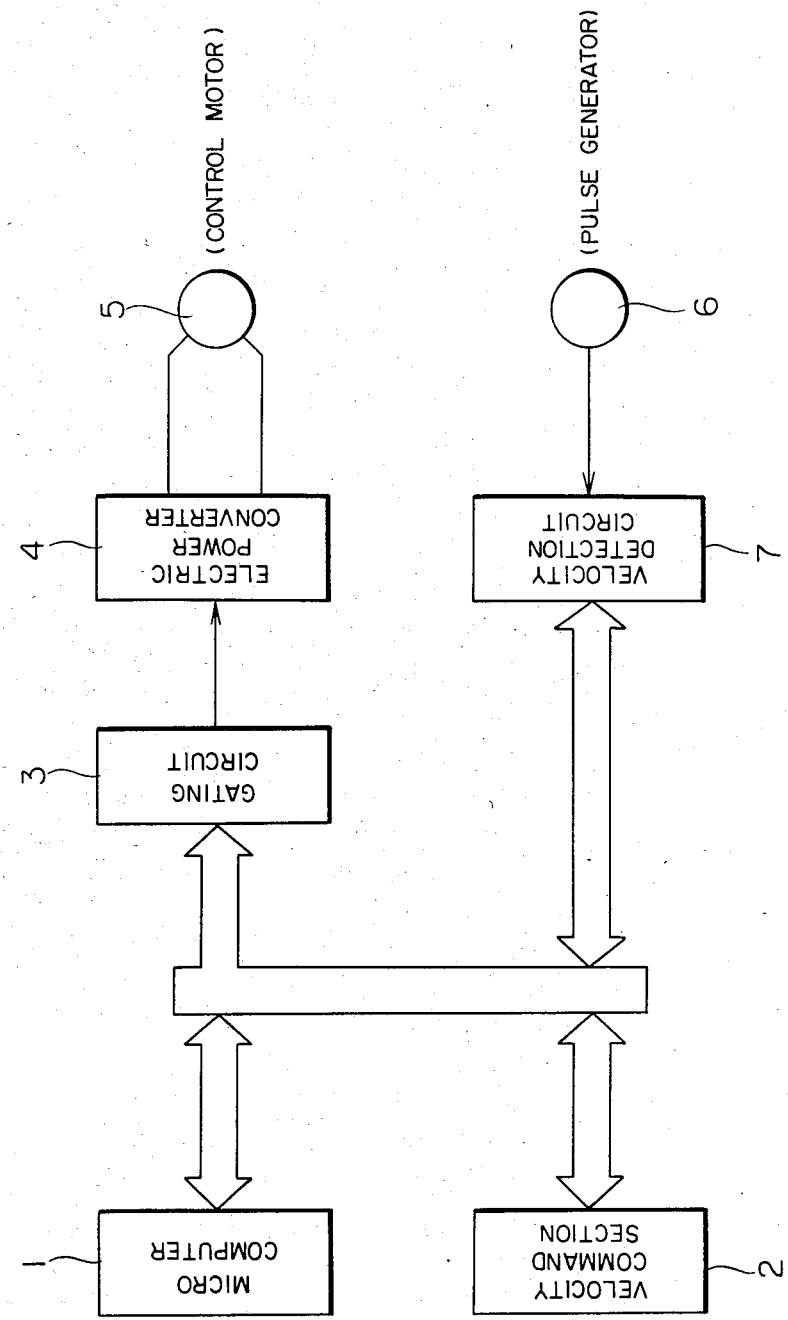
FIG. 1 is a block diagram showing the outline of a prior art apparatus.
Figure 2:
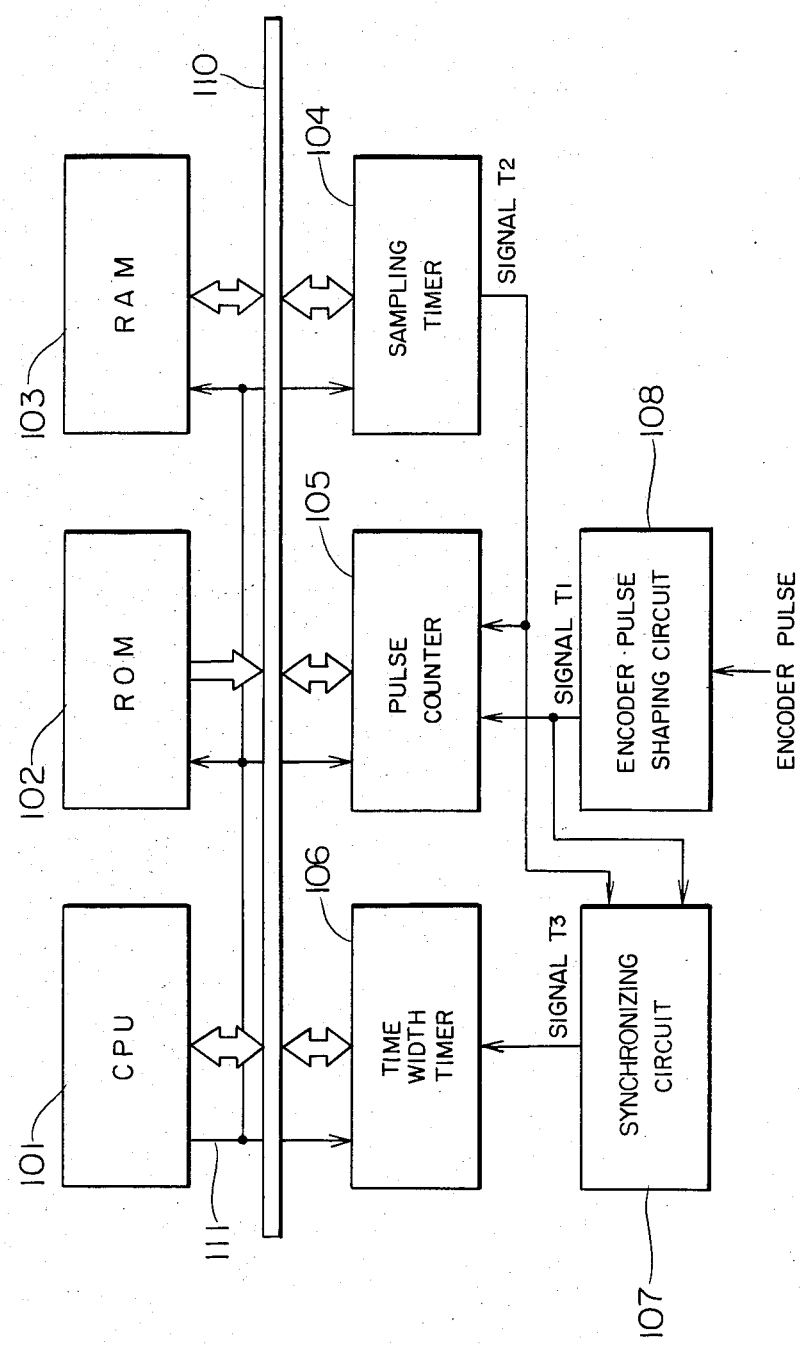
FIG. 2 is a block diagram of an apparatus for detecting the velocity, which can be used for implementing the method previously developed by the inventors of the present invention by using encoder pulses.
Figure 3:
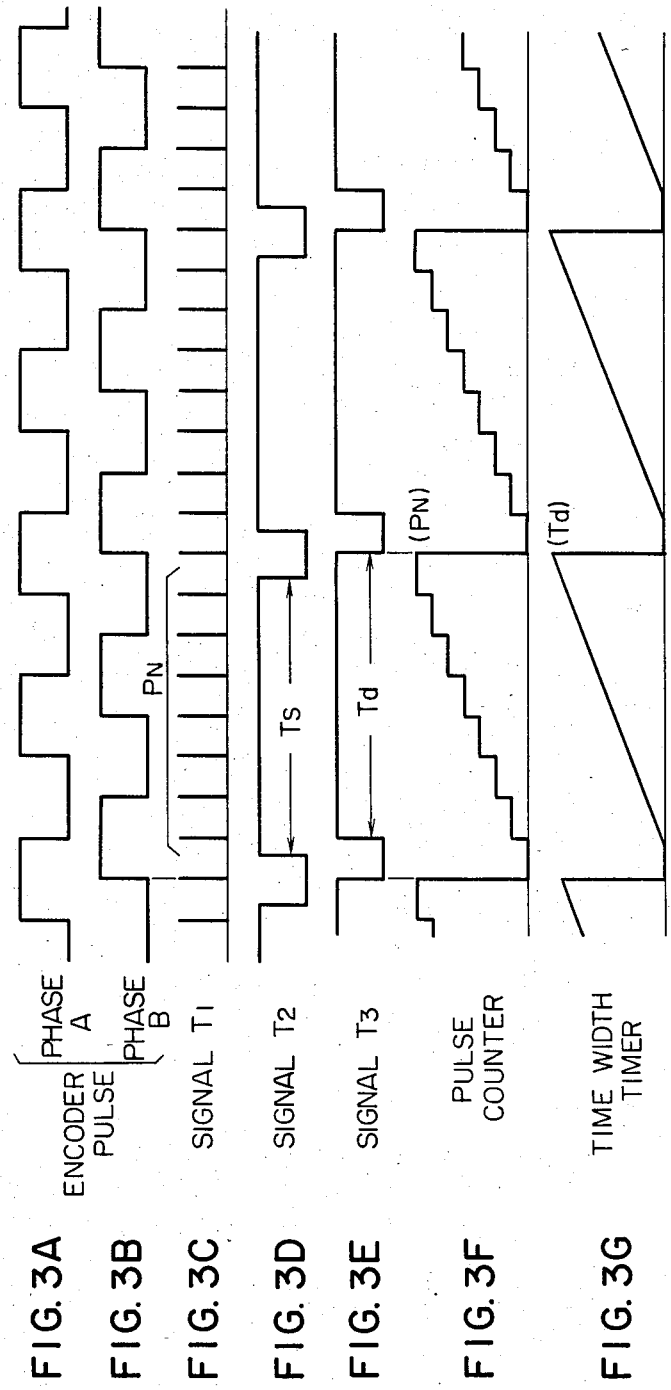
FIGS. 3A-3G are time charts for detecting the velocity by using the apparatus of FIG. 2.
Figure 4:
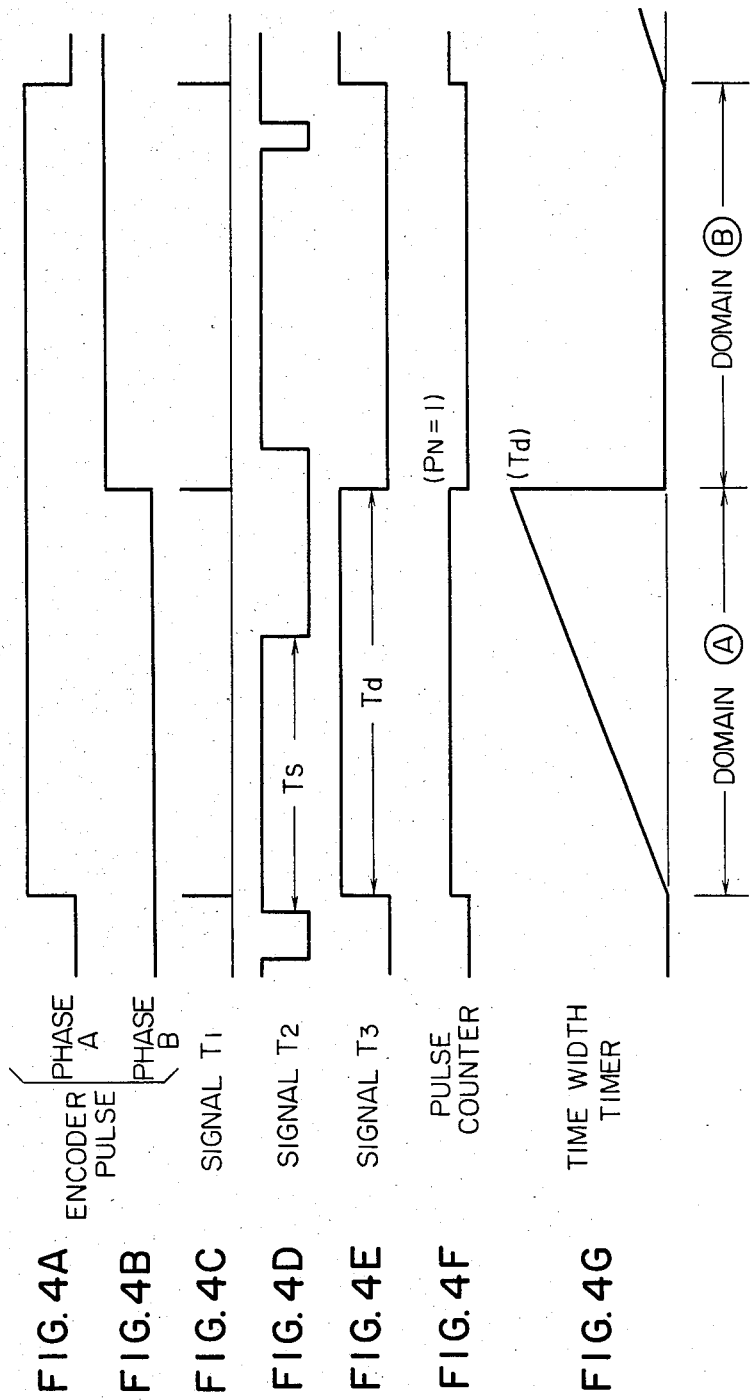
FIGS. 4A-4G are time charts for low speed detection, when the apparatus of FIG. 2 is used.

Reference numerals in FIG. 5, which are used also in FIG. 2, denote the same parts as in FIG. 2.

In the figure, reference numeral 401 denotes an encoder pulse generation circuit, which generates encoder pulses from encoder original signals.

Reference numeral 404 denotes a carrier wave generation circuit which generates carrier wave pulses having a width corresponding to a sampling time $T_S$ and forms a sawtooth shaped sampling carrier wave, and 403 is a pulse width modulation circuit which compares the sampling carrier wave with phase A encoder original signals and generates pulse-width modulated signals $S_1$.

Reference numeral 402 is a pulse width timer connected to the data bus 110 of a microcomputer, which timer measures the pulse width $T_E$ representing the width in time of the pulse width modulated signals $S_1$ which are output signals of the pulse width modulation circuit 403 and measured data about the pulse width $T_E$ thus obtained are taken in the CPU 101.

Based on these measured data about the pulse width $T_E$, data about the position $\theta(k)$ for each period of the carrier wave can be obtained, in principle, by using $A(k)$ obtained by the following equation (2) and by carrying out necessary numerical operations in the microcomputer.

$$A(k) = \sin^{-1} \frac{|T_S/2 - T_E(k)|}{T_S/2} \quad (2)$$

Next, the velocity $V_F$ can be calculated from the following equation (3) by using $\theta(k)$ and $\theta(k-1)$ obtained as above, $$V_F = \frac{K_2\{\theta(k) - \theta(k-1)\}}{T_S} \quad (3)$$

where, $\theta(k-1)$ is position data obtained the last time.

However, the angle obtained by using the equation (2) lies between 0 and $\pi/2$. Consequently, the positions in the different quadrants, I, II, III and IV, as indicated in FIGS. 6A–6L, should be differentiated by using two phase encoder signals.

Since the encoder pulse signal $T_1$ is controlled so that one pulse exists in each $\pi/2$, the position data $\theta(k)$ in the different quadrants take the values indicated in FIG. 7. Furthermore the rotation direction should be taken into account.

FIG. 8 is a flow chart for calculating the position data $\theta(k)$ according to FIG. 7. In FIG. 8, A(k) in the equation (2) is abbreviated to A.

That is, the pulse width timer 402 requests interruption to the CPU 101 for each period of the carrier wave and upon reception of the interruption request the CPU 101 carries out calculations according to the flow chart shown in FIG. 8.

The CPU 101 fetches the data about the pulse width $T_E$, calculates A(k) according to the equation (2), determines the direction of the rotation, forward or reverse, and finally calculates the position data $\theta(k)$ in each of the quadrants.

When the calculation shows that the position data $\theta(k)$ is equal to the preceding one $\theta(k-1)$, it means that the motor stands still. Thus, zero speed detection is also possible.

Since it is possible to detect any position between two encoder pulses adjacent to each other, precision of the position control can be improved by position detection in great detail.

In the operations described above, $\sin^{-1}$ can be obtained by calculation, but taking the operation speed of the CPU 101 used into account, it is also possible to use a table of values of $\sin^{-1}$ to obtain the values of $\sin^{-1}$.

Although it is not shown in the figures, the velocity can be calculated according to the equation (3) in the main routine.

As explained above, when the motor rotates slowly, according to this invention, the velocity can be detected for every sampling with a high precision.

However, when the motor rotates rapidly, by this method, the velocity cannot be obtained with a high precision, because the frequency of the sampling carrier wave is lower than that of the encoder original signals.

Consequently, perfect velocity detection can be obtained if the method utilizing the encoder original signals according to this invention is used for low speed rotation and the method on the basis of the equation (1) is used for high speed rotation. In this way a wide range velocity detection is possible by combining the two methods mentioned above.

According to this invention, a wide range velocity detection can be carried out for each sampling. In particular, this invention has an advantage that speed control response is increased for low speed rotation. Furthermore, detection of standstill of the motor (zero speed detection), which was impossible by the method previously developed by the inventors, is possible by this method. Thus, this invention contributes greatly to improvement of the controllability. Moreover, in the position control for a servo-motor the position detection can be effected for fine positions, and thus this invention has an eminent effect that precision of the position control is increased.

Although only a rotating body is described in the embodiment, this invention can be easily applied also to a linearly moving body, such as a linear motor, an XY table, a linear scale, etc.

What is claimed is:

1. A method for detecting position and velocity of a moving body by using a two-phase encoder mounted directly on said moving body, said encoder generating two sinusoidally varying original signals differing in phase, the method comprising the steps of:

pulse-width modulating one of said original signals by using a sampling carrier wave so as to derive a pulse-width modulated signal;

measuring a pulse width of said pulse-width modulated signal;

calculating, on the basis of said pulse width of said pulse-width modulated signal and a sampling time length of said sampling carrier wave, an angular position relative to a reference point of said moving body;

deriving, on the basis of said two original signals, information indicative of a quadrant of said one original signal in which said moving body is located;

deriving, on the basis of said angular position and said quadrant, the position of said moving body; and deriving, on the basis of variations in said position, the velocity of said moving body.

2. A method according to claim 1, wherein said moving body is a motor and said encoder is mounted on shaft of said motor.

3. An apparatus for detecting position and velocity of a moving body by using a two-phase encoder mounted directly on a moving body, said encoder generating two sinusoidally varying original signals differing in phase, said original signals varying sinusoidally, comprising:

carrier wave generating means for generating a sampling carrier wave;

pulse-width modulation means coupled to said carrier wave generation means and to said encoder for pulse-width modulating one of said original signals by using the sampling carrier wave;

pulse width timer means coupled to said pulse-width modulation means for measuring a pulse width of pulses obtained by pulse-modulating said one original signal;

calculation means, coupled to said two-phase encoder; said carrier wave generation means, said pulse-width modulation means and said pulse-width timer means, for calculating the position and the velocity of said moving body, said calculation means calculating, on the basis of said pulse width and a sampling time length of the sampling carrier wave, an angular position relative to a reference point of said moving body, deriving on the basis of said two original signals information indicative of a quadrant of said one original signal in which said moving body is located, deriving on the basis of said angular position and said quadrant, the position of said moving body, and deriving on the basis of variations in said position the velocity of said moving body.

4. An apparatus according to claim 3, wherein said moving body is a motor and said encoder is mounted on the shaft of said motor.

5. An apparatus according to claim 3, wherein said calculating means comprises a microcomputer.

* * * * *